US007774542B2

(12) United States Patent
Zhang et al.

(10) Patent No.: US 7,774,542 B2
(45) Date of Patent: Aug. 10, 2010

(54) SYSTEM AND METHOD FOR ADAPTIVE OPERATION OF STORAGE CAPACITIES OF RAID SYSTEMS

(76) Inventors: Ji Zhang, 16225 Oakhurst Dr., Monte Sereno, CA (US) 95030; Hain-Ching Liu, 42600 Palm Ave., Fremont, CA (US) 94539; Jian Gang Ding, 1218 Mayberry La., San Jose, CA (US) 95131

( * ) Notice: Subject to any disclaimer, the term of this patent is extended or adjusted under 35 U.S.C. 154(b) by 182 days.

(21) Appl. No.: 11/175,876

(22) Filed: Jul. 6, 2005

(65) Prior Publication Data

US 2007/0011401 A1    Jan. 11, 2007

(51) Int. Cl.
*G06F 12/16* (2006.01)
(52) U.S. Cl. .......................................... 711/114; 714/6
(58) Field of Classification Search ................. 711/114; 714/6
See application file for complete search history.

(56) References Cited

U.S. PATENT DOCUMENTS

| | | | | |
|---|---|---|---|---|
| 5,208,813 | A * | 5/1993 | Stallmo ........................... | 714/7 |
| 5,488,731 | A * | 1/1996 | Mendelsohn ................. | 711/114 |
| 5,499,337 | A * | 3/1996 | Gordon ........................... | 714/6 |
| 5,522,031 | A * | 5/1996 | Ellis et al. ....................... | 714/6 |
| 5,875,457 | A | 2/1999 | Shalit | |
| 6,058,489 | A * | 5/2000 | Schultz et al. ................. | 714/7 |
| 6,154,853 | A | 11/2000 | Kedem | |
| 6,233,648 | B1 * | 5/2001 | Tomita ........................... | 711/4 |
| 6,510,491 | B1 * | 1/2003 | Franklin et al. ............. | 711/114 |
| 6,530,004 | B1 | 3/2003 | King et al. | |
| 7,180,732 | B2 * | 2/2007 | Meehan et al. ............... | 361/685 |
| 7,383,379 | B2 * | 6/2008 | Patterson et al. ............ | 711/114 |
| 2003/0120865 | A1 * | 6/2003 | McDonald et al. .......... | 711/114 |
| 2004/0068612 | A1 * | 4/2004 | Stolowitz ..................... | 711/114 |
| 2004/0133743 | A1 * | 7/2004 | Ito et al. ....................... | 711/114 |
| 2004/0162957 | A1 * | 8/2004 | Don et al. ..................... | 711/170 |
| 2004/0172503 | A1 * | 9/2004 | Merchant ..................... | 711/114 |
| 2005/0182992 | A1 * | 8/2005 | Land et al. ................... | 714/701 |
| 2006/0069716 | A1 * | 3/2006 | Fleiner et al. ................ | 709/203 |
| 2006/0174156 | A1 * | 8/2006 | Balasubramanian ........... | 714/6 |
| 2006/0248379 | A1 * | 11/2006 | Jernigan, IV ................... | 714/6 |

FOREIGN PATENT DOCUMENTS

JP         07306758 A   * 11/1995

* cited by examiner

*Primary Examiner*—Shane M Thomas
*Assistant Examiner*—Kaushikkumar Patel
(74) *Attorney, Agent, or Firm*—Stolowitz Ford Cowger LLP

(57) ABSTRACT

Apparatus and methods for efficiently operating on RAID systems. A fast access buffer comprising an off-disk fast access memory module supports RAID operations such as recovery or reconfiguration operations, thereby minimizing or reducing the need for on-disk destructive zones and/or reducing disk drive I/O activities. In some cases the fast access memory module to serves as a read/write cache, reducing the need for frequent disk accesses of a small number of data blocks. Fast off-disk memory such as RAM enables rapid operation on in-buffer data blocks. Access to the material stored in the RAID devices may be enabled, partially enabled or disabled during RAID operations involving the fast access memory module and some data access operations may be synchronized with RAID operations. In some cases, data may be served from the fast access memory module, thereby providing rapid access to material stored in a RAID device during RAID operations.

29 Claims, 7 Drawing Sheets

A fast access buffer receives one or more data blocks from one or more source RAID devices (Step 300).

RAID operations are executed on the data stored in the fast access buffer (Step 310).

Data blocks are transmitted for copying to one or more target RAID devices (Step 320).

Optionally, Steps 300, 310 and 320 are repeated to support completion of a RAID operation (Step 330).

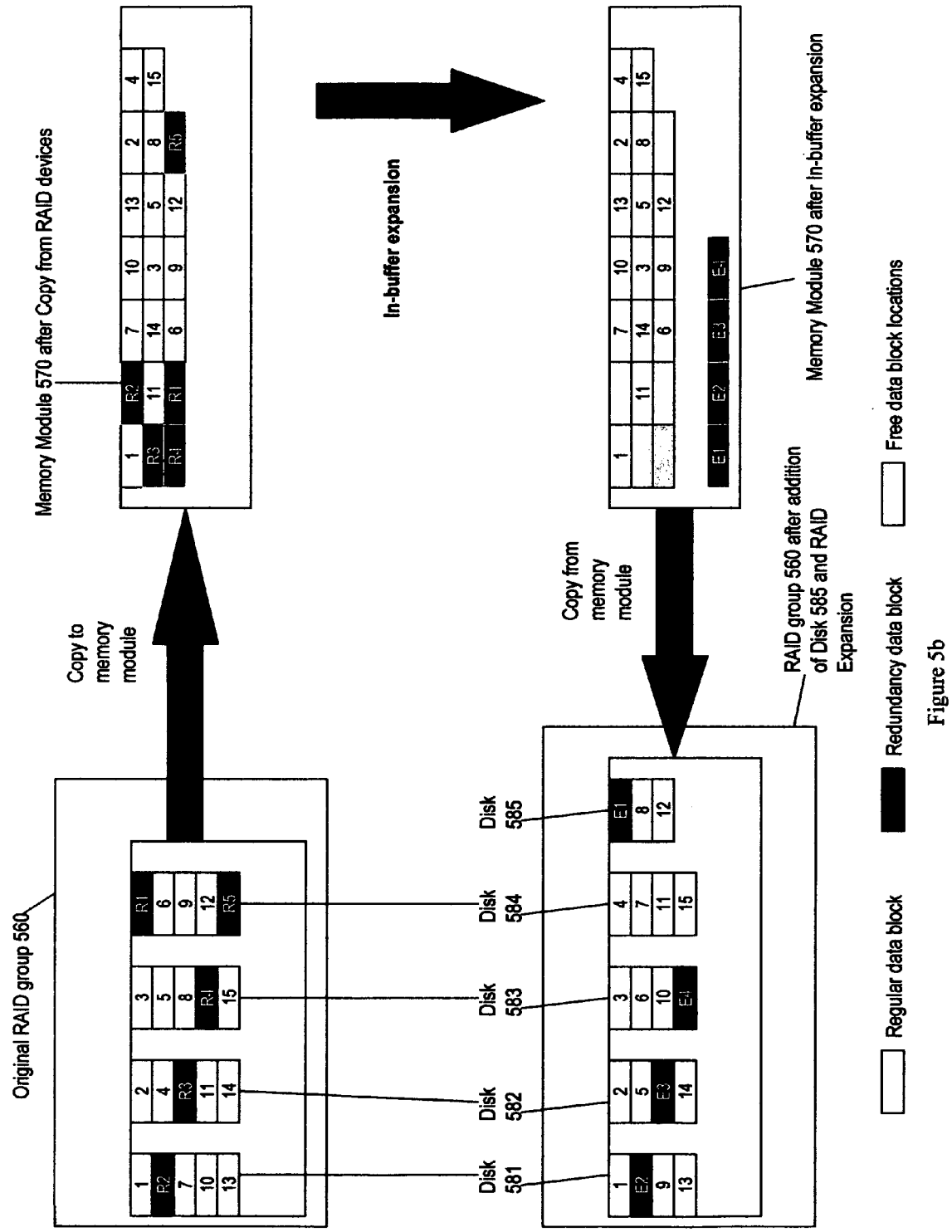

A controller, such as a buffer operations manager or RAID controller, manages a RAID operation in conjunction with a fast access buffer (Step 600).

During the execution of the RAID operation, the controller receives or intercepts a read request for data stored on the RAID group (Step 610).

The controller identifies the location of the authoritative copy of the data (Step 620).

 

If the authoritative copy of the requested data is stored in the fast access memory module, the controller may fulfill the read request by initiating a copy operation from the fast memory module (Step 630).

If the authoritative copy of the requested data is not stored in the fast access memory module, the controller determines if the data exists on the RAID group (Step 640).

If the data exists on the RAID group, the controller may initiate the data retrieval from the RAID group and fulfill the request or wait until the data is on the RAID group to fulfill the request (Step 650).

Figure 6

SYSTEM AND METHOD FOR ADAPTIVE OPERATION OF STORAGE CAPACITIES OF RAID SYSTEMS

FIELD OF INVENTION

Invention relates to apparatus and methods for performing operations on RAID (Redundant Array of Inexpensive Disks) storage systems.

BACKGROUND OF INVENTION

Storage systems using RAID (Redundant Array of Inexpensive Disks) technology are widely used. With RAID technologies, data is arranged across multiple disks (or multiple RAID arrays in a RAID-on-RAID configuration) to support redundancy and/or improved access, depending on the particular RAID configuration. When a RAID controller controls a set of RAID arrays, it is sometimes called a "RAID-on-RAID" configuration. RAID configurations require processing resources to manage the distribution of data across the disk drive storage devices or RAID arrays and, in most configurations, temporary storage or swap space to support RAID and RAID maintenance activities.

For example, in most RAID configurations, data integrity is protected by adding redundancy across multiple disk drives such that the loss of a single disk (or the loss of a RAID array in a RAID-on-RAID configuration) will not result in data loss. For example, in a RAID 5 configuration, data is stored in blocks of equal size and the data blocks are distributed across multiple disk drives. Parity data blocks are calculated and distributed across the disk drives such that if a single disk drive is lost, the contents of the lost disk drive many be rebuilt using the available data information from the other working disk drives. Rebuilding a RAID 5 disk entails deriving or calculating the contents of the lost disk drive (or RAID array in a RAID-on-RAID configuration) based on the available data blocks and/or parity data blocks residing on the remaining disk drives.

In some cases, RAID operations may be very I/O intensive. In some cases, RAID systems may be taken off-line during RAID operations, disrupting data access. In other cases, when access to RAID systems is maintained during RAID operations, data access may be slow, due in part to the significant impact of I/O activities. For example, one I/O intensive technique for expanding a RAID 5 system includes the following steps: copying the entire data set from the existing RAID system to a back-up storage location, erasing the RAID format, adding one or more disk drive storage devices to the RAID system, reformatting the expanded group into a bigger RAID system and copying the saved data back.

In some cases the use of a destructive zone may reduce some resource requirements for expanding a RAID-5 system. For example, in some cases, a destructive zone may be enabled by allocating disk storage sections on existing disk drives in the RAID system and dedicating those sections as "destructive zones" to serve as temporary storage during a RAID expansion operations. The destructive zone(s) may be used for temporarily holding or rearranging parity data blocks, data blocks and/or intermediate calculations associated with RAID operations, thereby reducing off-disk I/O operations. However, by using an on-disk destructive zone, RAID operations may still be subject to hard disk input/output limitations and/or hard disk access delays as data is physically relocated on a hard disk and/or copied from hard disk to hard disk. Furthermore, in some cases, access to the data stored on a RAID system may be slow or unavailable during rebuilding or maintenance activities.

In some cases, it is time consuming, disruptive and/or resource intensive to execute other RAID rebuilding or maintenance related activities such as, but not limited to, rebuilding a disk, reformatting a RAID system, expanding a RAID system, shrinking a RAID system, migrating RAID system hardware or software, changing the standard RAID system block size format.

What is needed is a method and apparatus for enabling efficient maintenance and/or recovery for RAID systems.

SUMMARY OF INVENTION

The present invention provides apparatus and methods for efficiently operating on RAID systems. For example, the current invention may be used for a variety of purposes such as, but not limited to, reconfiguring a RAID system for the purpose of modifying its storage capacity. According to the current invention, a fast access buffer comprising an off-disk fast access memory module is used to store, manipulate and/or operate on data blocks; RAID operations on the data blocks may be executed with respect to the data blocks in the fast access memory module. In some cases, multiple data blocks may be read from the source RAID device(s) and/or written to the target RAID device(s) enabling the fast access memory module to serve as a read/write cache, thereby improving input/output performance compared to RAID systems that operate based on more frequent disk accesses of a small number of data blocks.

In some cases, the fast access memory reduces or eliminates the need for on-disk storage such as, but not limited to, destructive zones or swap spaces disposed on the disk drives in a RAID configuration. The fast access memory module comprises at least some off-disk memory such as, but not limited to random access memory (RAM), and may or may not comprise additional on-disk memory. Typically, operations such as moving or manipulating data blocks in RAM take less time than analogous operations conducted in on-disk destructive zones or swap spaces established on disk drives in a RAID configuration.

In some examples according to the current invention, operation of the fast access memory module may be managed by one or more controllers such as, but not limited to, one or more controllers integrated with the fast access memory module, external controllers, server based controllers, RAID array controllers and buffer operations managers. Some embodiments according to the current invention may operate in conjunction with hardware, firmware and/or software controllers or any combination thererof.

In some examples according to the current invention, during RAID operations involving the fast access memory module, access to the material stored in the RAID devices may be enabled, partially enabled or disabled. In some cases, data access operations on the RAID devices may be synchronized with RAID operations involving the fast access memory; for example, in some cases, this may involve minimizing disk access operations, minimizing the time required to complete the RAID operation and/or minimizing delays in access operations. In some cases, when requested data is resident in the fast access memory module, it may be rapidly served from the fast access memory module, thereby providing rapid access to material stored in a RAID device during RAID operations.

In one example according to the current invention, a RAID expansion may be executed on a RAID system without requiring the data to be copied to an intermediate hard disk before copying it back to one or more disks in the expanded RAID system. In some cases, a RAID expansion may be executed without interrupting access to the data on the RAID system. Furthermore, in some cases, the I/O throughput rates for on-going read-write requests during the expansion may be maintained at relatively high rates by operating on validated copies of the data stored on the fast access memory module, thereby reducing disk access operations.

BRIEF DESCRIPTION OF DRAWINGS

FIG. 6 is a block diagram illustrating the steps associated with an example of enabling read operations during RAID operations for an example of a fast access buffer according to the current invention.

DETAILED DESCRIPTION OF PREFERRED EMBODIMENTS

Figure 1:
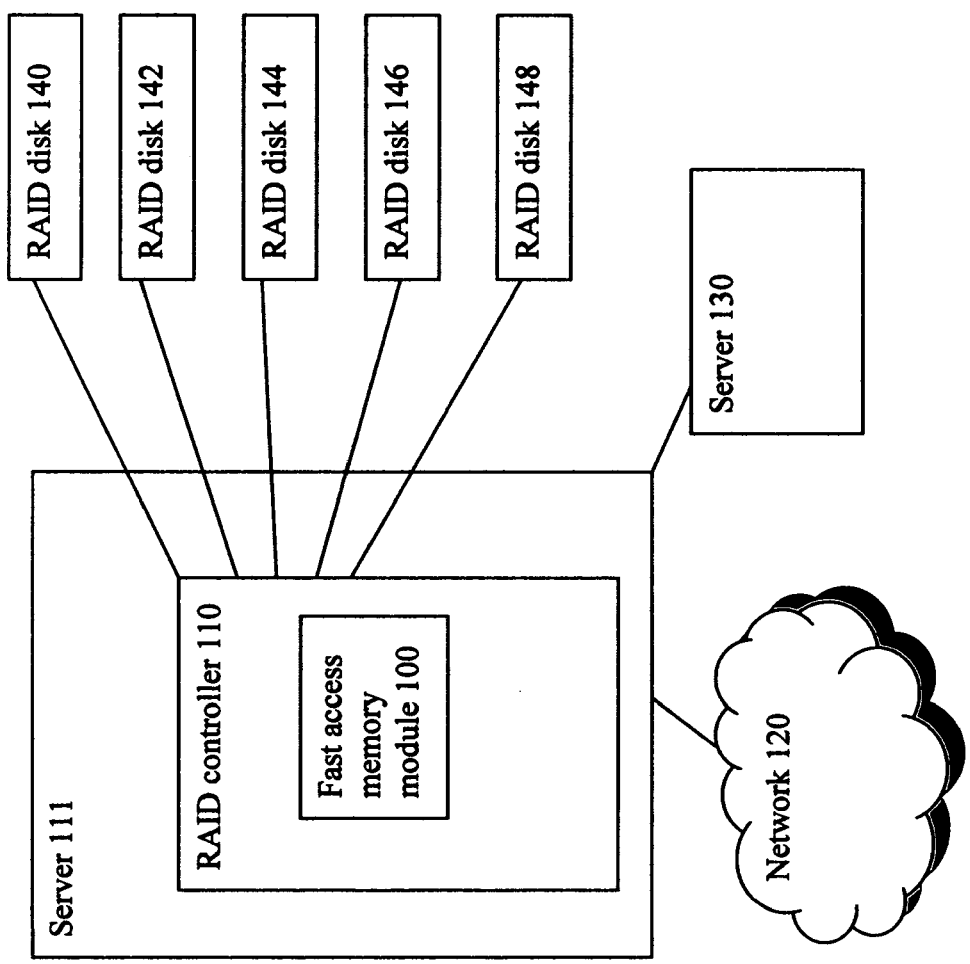
FIGS. 1, 2 and 3 illustrate examples of fast access memory modules according to the current invention for enabling efficient RAID operations.
Figure 2:
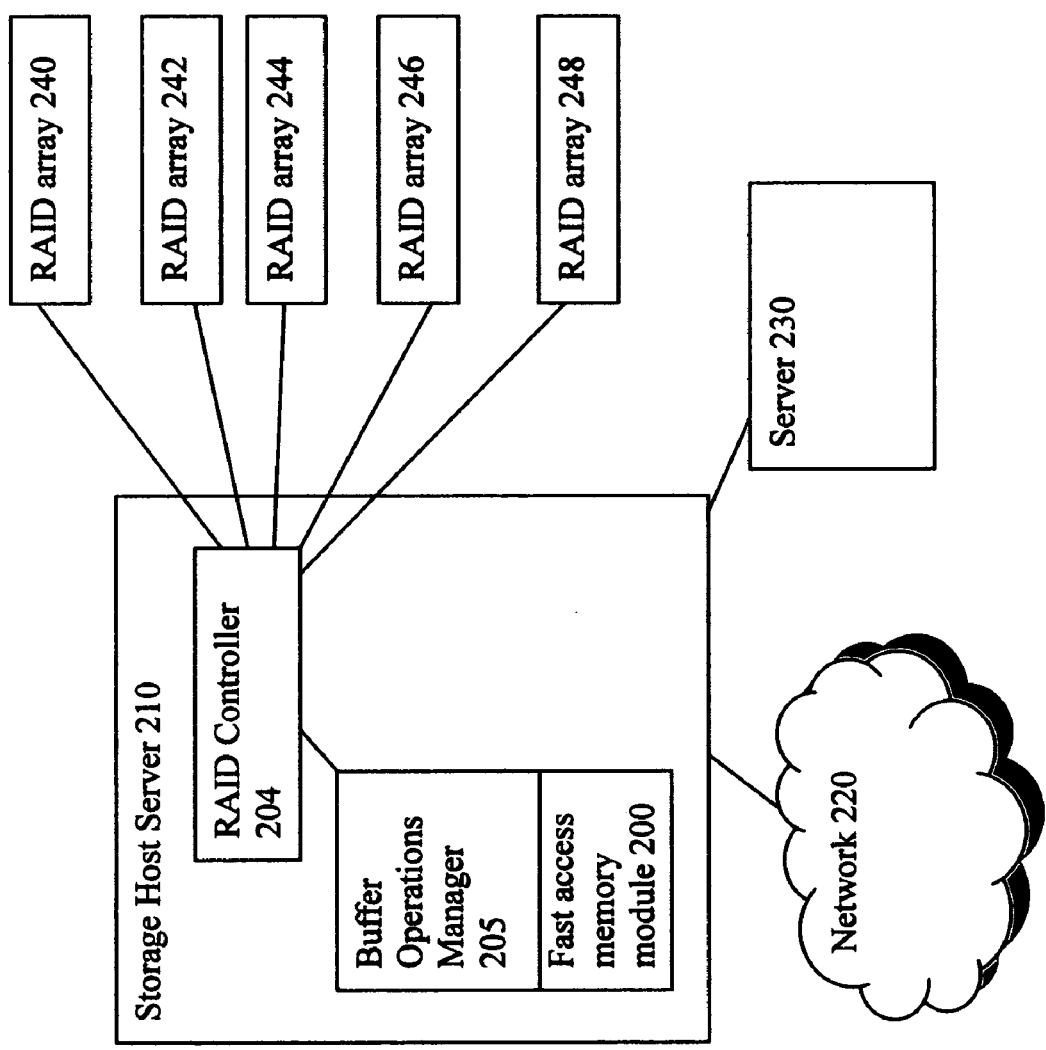
Figure 3:
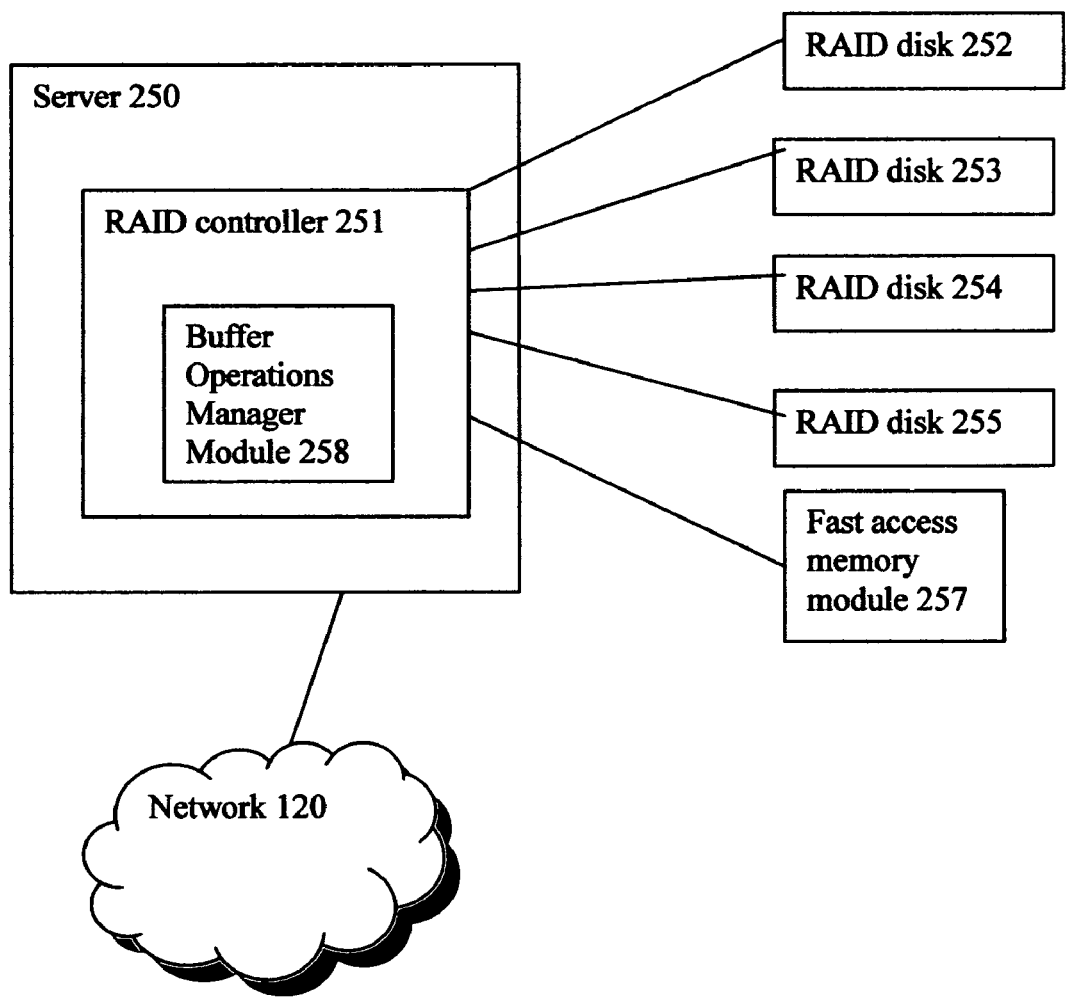

According to the current invention, a fast access buffer comprises a fast access memory module and one or more interfaces for coupling the fast access memory module to one or more source RAID devices, one or more target RAID devices and one or more controllers for managing RAID operations associated with the fast access memory module. FIGS. 1, 2 and 3 illustrate examples of fast access memory modules 100, 200 and 257 according to the current invention for enabling efficient RAID operations. In the example illustrated in FIG. 1, the fast access memory module 100 comprises memory separate from disk drives 140, 142, 144, 146 and 148 such as, but not limited to, random access memory (RAM). In some cases according to the current invention, a fast access memory module may or may not comprise additional memory such as, but not limited to memory disposed on a disk drive in a RAID configuration and/or RAID device.

According to the current invention, a fast access buffer comprises one or more interfaces for coupling to one or more source RAID devices and one or more target RAID devices. A source RAID device comprises a disk drive in a RAID configuration, RAID device or RAID system which serve as sources for the data blocks and/or redundancy data blocks received by the fast access buffer. A target RAID device comprises a disk, RAID device or RAID system which serve as destinations for the data blocks and/or redundancy data blocks output by the fast access buffer. In some cases, one or more of the source RAID device(s) may also be target RAID devices. For example, when considering the expansion of a four disk RAID array to a five disk RAID array, the four source devices would be the original four disks and the five target devices would include the original four disks in addition to the new fifth disk.

In the example illustrated in FIG. 1, fast access memory module 100 is coupled to and disposed on a RAID controller 110 which is coupled to multiple RAID devices (disk drives 140, 142, 144, 146 and 148) which may comprise source and/or target RAID devices associated with various RAID operations; in this example, fast access memory module 100 interfaces indirectly to example source RAID devices and target RAID devices (disks drives 140, 142, 144, 146 and 148) through RAID controller 110. Furthermore, in this example, RAID controller 110 controls the RAID source devices, the RAID target devices and acts as the controller for managing RAID operations associated with the fast access memory module. In this example, RAID controller 110 is implemented as a component of Server 111 and RAID devices are coupled directly to the RAID controller. However, other configurations are illustrated and envisioned.

According to the current invention, the source and/or target RAID devices may comprise disk drives in a RAID configuration and/or RAID arrays. For example, in FIG. 2, the source and target RAID devices are RAID arrays 240, 242, 244, 246 and 248 which are coupled to a fast access memory module 200 according to the current invention through Storage Host Server 210. In some cases, the source RAID devices and the target RAID devices may not be the same type of device. For example, in some cases, the current invention may be used to support a hardware migration from an array of disk drives in a RAID configuration to an array of RAID arrays wherein the source RAID devices would be disk drives in a RAID configuration and the target RAID devices would be RAID arrays.

According to various embodiments of the current invention, a fast access buffer may be used to enable efficient RAID operations related to RAID devices such as, but not limited to, rebuilding a RAID array in a RAID-on-RAID configuration, rebuilding a RAID drive, expanding a RAID array, shrinking a RAID array, migrating RAID data to accommodate a RAID hardware migration, migrating RAID data to accommodate a RAID software migration, migrating RAID data to migrate to a different RAID level, reformatting a RAID array, restoring a RAID array in a RAID-on-RAID configuration and restoring a disk drive in a RAID configuration. In some examples according to the current invention, a fast access buffer may reduce or eliminate the need for destructive zones disposed on the disk drives in a RAID configuration.

In the example illustrated in FIG. 1, the entire fast access memory module 100 is disposed on a RAID controller 110; RAID controller 110 is disposed on a server 111 and the operation of the fast access buffer is managed by the RAID controller 110. However, in other examples according to the current invention, some or all of the fast access buffer may or may not be disposed on a RAID controller. For example, in FIG. 2, an example of a fast access memory module 200 according to the current invention is disposed on a storage host server 210; in this example, the operation of the fast access buffer 200 is managed by buffer operations manager 205.

In the example illustrated in FIG. 3, RAID controller 251 is disposed in host server 250 and fast access memory module 257 is external to both the RAID controller 251 and host server 250. In this example, the fast access memory module is managed by RAID controller 251. A buffer operations manager module 258 may be implemented in hardware, software and/or firmware. In the example illustrated in FIG. 3, the buffer operations manager module is implemented as a part of RAID controller 251.

According to alternate examples of the current invention, a buffer operations manager module may be distributed across multiple locations internal to and/or external to the RAID controller, host server and/or fast access memory module. In some cases, a buffer operations manager may be distributed across multiple software applications, hardware components, firmware components and/or hardware platforms. For example, in some cases, a buffer operations manager may use local and/or distributed server resources to execute some or all processes.

In the example illustrated in FIG. 1, fast access memory module 100 supports the operation of RAID controller 110, managing an array of disk drives 140, 142, 144, 146 and 148. According to the current invention, RAID configurations such as, but not limited to, RAID level 0, RAID level 1, RAID level 2, RAID level 3, RAID level 4, RAID level 5, RAID level 6, RAID level 10, RAID level 50, RAID level 53, RAID level 0+1 may be supported. FIG. 2 illustrates an example according to the current invention wherein a fast access buffer is used to support the operation of a RAID configuration for ensuring data integrity in case of a managed RAID array failure in a RAID-on-RAID configuration. In this example, RAID arrays 240, 242, 244, 246 and 248 each comprise their own RAID controller and two or more hard disks.

Figure 4:
FIG. 4 is a block diagram illustrating an example process of rebuilding a single failed RAID-5 disk from a RAID 5 group using a fast access buffer according to the current invention.
Figure 4:
Figure 4:

In some examples according to the current invention, a fast access buffer may reduce or eliminate the need for destructive zones disposed on the disk drives in a RAID configuration. For example, FIG. 4 is a block diagram illustrating an example process of rebuilding a single failed disk drive from a RAID-5 configured group using a fast access buffer according to the current invention. The process begins when a fast access buffer receives one or more data blocks from one or more source RAID devices (Step 300). In this example, fast access buffer may be managed by an external resource such as, but not limited to, a buffer operations manager or a RAID controller; in some cases, a fast access buffer may be integrated with a hardware, software and/or firmware management resource. In this case, a management resource initiates the retrieval of one or more data blocks from a source RAID device. In this example, the RAID operation is the rebuild of a failed RAID-5 disk which requires access to the other RAID devices in the RAID group. The management resource retrieves the data blocks from the remaining RAID devices in the RAID group, representing data and parity information, and stores the retrieved data blocks in the memory module.

In some cases, the management resource may direct the retrieval of data and parity information on a block-by-block basis. However, in some cases, the size of the memory module in the fast access buffer and the sophistication of the management resource may support copying multiple data blocks from the source RAID devices in each read operation, possibly improving performance by reducing the number of small read operations on the RAID disk drive group. In some cases, the memory module will not have the capacity to hold all of the data blocks required to complete the full RAID operation at one time and the RAID operation may be broken up into smaller RAID operations such as, but not limited to, rebuilding a segment of the failed RAID hard disk.

The process continues when RAID operations are executed on the data stored in the fast access buffer (Step 310). In this case, the RAID operation comprises regenerating missing data and parity information based on the remaining data and parity information stored on the remaining disks in the RAID disk drive group. In some cases, the fast access buffer may provide storage for intermediate calculations and/or the regenerated data and/or parity information. In some cases, supplemental storage disposed on a disk drive in a RAID configuration may or may not be used. The current invention may reduce or eliminate the need for destructive zones on disk drives in a RAID configuration; however, in some cases, the current invention may be used in conjunction with on-disk storage such as, but not limited to, destructive zones.

In some cases, the RAID operation may call for data blocks to be re-arranged on the target RAID devices. In some cases, during the execution of RAID operations on the data stored in the fast access buffer, data blocks may be re-arranged in the memory module to prepare for subsequent copying to one or more target RAID devices. However, m some cases, the target locations may be calculated, but the actual locations of the data blocks in the memory module may or may not be changed to prepare for subsequent copying to the target locations; instead, in some cases, some of the data blocks may be left in place and the subsequent copying operation may access the data blocks for copying according to their target locations, thereby copying non-adjacent data blocks in the memory module to adjacent locations on a target RAID device. When some or all of the memory module is implemented using random access memory (RAM), the order of the data blocks and/or redundancy blocks in the memory module may not be required to reflect the target order of the data blocks and/or redundancy blocks on the target RAID device. Furthermore, a random access memory (RAM) based module may support flexible and rapid operations.

The process continues when data blocks are transmitted for copying to one or more target RAID devices (Step 320). In some cases, data blocks representing data and/or parity information may be transmitted for copying to a target RAID device. In this case, the target RAID device is a replacement disk drive for the failed RAID-5 disk. In some cases, the data blocks may be copied from a storage location in the memory module of the fast access buffer. However, in other cases, the data blocks may be transmitted for copying to the target RAID device as the data blocks are calculated and they may not be associated with a temporary storage location in the fast access buffer. In some cases, copying may take place in a block-by-block mode. However in some cases, multiple data blocks may be transmitted for copying to the target RAID device in each write operation, possibly improving performance by reducing the number of small write operations on the RAID disk drive group.

Optionally, the process continues when steps 300, 310 and/or 320 are repeated to support completion of the RAID operation (Step 330). In this example, the RAID operation is rebuilding an entire failed disk drive. Depending on the size of the memory module in the fast access buffer and the size of the failed disk drive, steps 300, 310 and 320 may be repeated multiple times.

In some embodiments of the current invention, copying data blocks to and/or from the fast access buffer may be enabled in a block-by-block method and/or a bulk method. As mentioned above, the block-by-block method may incur multiple small read and/or write operations on the RAID device(s), possibly resulting in slow performance; enabling read and/or write operations involving more than a single data block per read or write operation may reduce the total number of read and/or write operations on the RAID device(s) and may possibly result in improved performance. In some cases, enabling the largest data block size transfer supported by the RAID system and the rapid access buffer may result in the most efficient throughput.

In some cases, the fast access buffer may act as a read/write cache. In some cases, when a fast access buffer according to the current invention receives the results of a read operation involving multiple data blocks, one or more of the retrieved data blocks may be ignored for the purposes of the RAID operation; for example, data in the memory module may be used selectively wherein some data is ignored or deleted after retrieval from the source RAID device. For example, in an expansion on a RAID level 5 disk array, the original redundancy data blocks are not required to complete the expansion transaction. In some cases, the original redundancy data blocks may be retrieved, copied to the rapid access buffer and then overwritten, discarded or ignored in the rapid access buffer; in other cases, the original redundancy data blocks may not be retrieved or they may be retrieved from the hard disk, but never saved to the rapid access buffer.

As mentioned above, according to various examples of the current invention, when some or all of the memory module is implemented using random access memory (RAM), the order of the data blocks and/or redundancy blocks in the memory module may or may not reflect the target order of the data blocks and/or redundancy blocks on the target RAID device(s). In some cases, this flexibility may enable rapid RAID operations. For example, FIGS. 5a and b illustrate examples of data block positions during an in-buffer expansion according to different embodiments of the current invention.

Figure 5A:
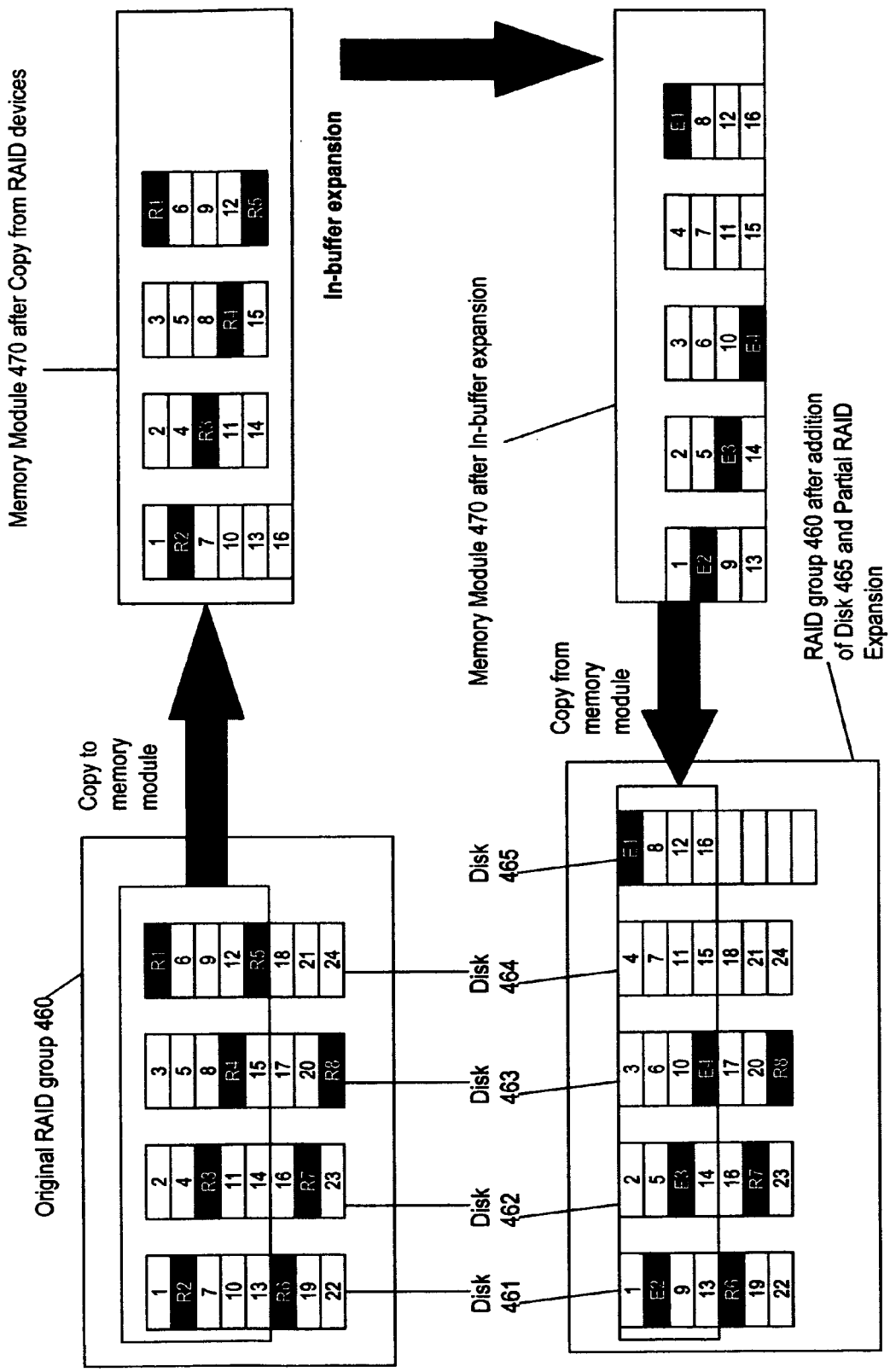
FIGS. 5a and b illustrate examples of data block positions during an in-buffer expansion according to different embodiments of the current invention.

FIG. 5a illustrates the position of data blocks associated with a RAID 5 level RAID group as RAID group 460 is expanded from four hard disks (460, 461, 462 and 463) to five hard disks (460, 461, 462, 463 and 464) in conjunction with a memory module 470 according to the current invention wherein the data block positions in the fast access buffer are arranged to reflect the target order of the data blocks and/or redundancy blocks on the target RAID devices. FIG. 5a is a graphic representation of the data blocks associated with RAID group 460 and memory module 470; however, in some cases, data blocks may be aligned, but not necessarily in the same aligned format shown in FIG. 5a In this example, the first five data blocks are read from each of the original four hard disks (460, 461, 462 and 463) and written to memory module 470. In this example, the first five data blocks comprise regular data blocks and redundancy data blocks, representing a portion of the full data set stored in RAID group 460.

The number of data blocks to read from each disk may be selected based on one or more criteria such as, but not limited to, the largest number of data blocks that may be read in a single hard disk access command, the size of the memory module and/or hard disk input/output considerations. In this example, an in-buffer expansion is executed in memory module 470, creating new redundancy blocks and discarding old redundancy blocks; data blocks are re-arranged in the memory module 470 to correspond to the target spatial position and/or target order of the data blocks on target RAID devices 460, 461, 462, 463 and 464. In this example, the arranged data blocks are copied to target hard disks 460, 461, 462, 463 and 464 based at least in part on their positions in the memory module 470; the first five data blocks from each disk represent a portion of the full data set stored in RAID group 460, so the remaining unprocessed data blocks on disks 460, 461, 462 and 463 may be processed in subsequent steps to complete the RAID system expansion.

FIG. 5b illustrates the position of data blocks associated with a RAID 5 level RAID group as RAID group 560 is expanded from four hard disks (560, 561, 562 and 563) to five hard disks (560, 561, 562, 563 and 564) in conjunction with a memory module 570 according to the current invention wherein the data block positions in the fast access buffer are not re-arranged to reflect the target order of the data blocks and/or redundancy blocks on the target RAID devices. FIG. 5b is a graphic representation of the data blocks associated with RAID group 560 and memory module 570; however, in some cases, data blocks may be aligned, but not necessarily in the same aligned format shown in FIG. 5b. In this example, the first five data blocks are read from each of the original four hard disks (560, 561, 562 and 563) and written to memory module 570. In this example, the first five data blocks comprise regular data blocks and redundancy data blocks, representing the full data set stored in RAID group 560 and the memory module 570 is large enough to hold the entire contents of the original four hard disks (560, 561, 562 and 563) as well as enough memory to support intermediate calculations and/or swap space.

The number of data blocks to read from each disk may be selected based on one or more criteria such as, but not limited to, the largest number of data blocks that may be read in a single hard disk access command, the size of the memory module and/or hard disk input/output considerations. In this example, an in-buffer expansion is executed in memory module 570, creating new redundancy blocks and discarding old redundancy blocks; data blocks are not re-arranged in the memory module 570 to correspond to the target spatial position and/or target order of the data blocks on target RAID devices 560, 561, 562, 563 and 564. This example highlights a possible benefit provided by a random access memory buffer. In this example, a controller manages copying the data blocks from the memory module 570 to target hard disks 560, 561, 562, 563 and 564; in this example, the memory module was large enough to manage the entire contents of RAID group 560 and complete the RAID operation in a single pass.

In some examples of a fast access buffer according to the current invention, access to data during maintenance and/or RAID operations may be enabled. Access operations may include, but are not limited to, reading data, writing data and deleting data. For example, in some cases, the current invention may operate in a mode consistent with disabling all access, allowing partial access or allowing full access to data during the execution of maintenance and/or RAID operations. In some cases, the access mode may be managed by a RAID controller or a buffer operations manager. For example, in some cases, the current invention may be configured to disable access to data during some or all maintenance and/or RAID operations. In some cases, by disabling access to data during RAID operations, the time required to complete the RAID operation may be minimized and/or the complexity of the hardware, software and/or firmware associated with the RAID controller and/or buffer operations manager may be reduced.

The current invention may be used to support the operation of RAID devices, especially recovery, maintenance and reconfiguration operations. While executing RAID operations such as, but not limited to recovery, maintenance and reconfiguration operations, various embodiments of the current invention may offer various levels of concurrent access to the data on the RAID systems. Examples of three possible access levels comprise enabled, disabled or partially enabled. The access levels may or may not be the same for all operations. For example, in some cases, a system may be configured to deny all data access to a RAID system during some or all recovery, maintenance and/or reconfiguration operations; in other examples according to the current invention, partial access to data stored on the RAID systems, such as read-only access, may be enabled during some or all recovery, maintenance and/or reconfiguration operations; in other examples, full read-write access may be enabled during some or all recovery, maintenance and/or reconfiguration operations.

In some cases, when concurrent access is enabled, it is important to determine the location of the authoritative or master copy of data blocks. In many cases, the authoritative or master copy of data blocks is the newest copy. However, in some cases, the authoritative or master copy may not be the newest copy. For example, when data is associated with an atomic transaction, the latest copy of data blocks may not be the authoritative copy until the transaction has been committed. As RAID operations are executed, the data blocks resident on a disk drive in a RAID configuration or RAID array may not match the copy of data blocks resident in the fast access memory module. Identifying the authoritative or master copy is important in order to avoid accessing stale data and/or corrupting data stores. Furthermore, in some cases, it may be important to keep the data blocks resident in the fast access memory module in synch with the data blocks resident on the hard disks in the RAID system. For example, in some cases, the fast access memory module may be volatile. Storing the only authoritative copy of a data block in volatile memory incurs the risk of data loss or corruption in the event of power disruption. For this reason, some examples of the current invention may require that writing data to data blocks stored in the fast access memory module be done in coordination with writing the data to data blocks stored on a disk drive managed by the RAID system.

In some cases, when partial or complete access to data stored on the RAID systems during RAID operations is enabled, access operations may be synchronized, prioritized and/or optimized with respect to RAID operations involving the fast access buffer and/or other activities. For example, in some cases, read-only access may be enabled during some or all RAID operations. For example, a buffer operations manager and/or RAID controller may be configured to support read operations for data stored on a RAID device and/or data temporarily stored in the fast access buffer according to the current invention.

In some cases, enabling access to data residing on the memory module may result in very rapid data access due in part to the fast access memory module's fast access times. For example, consider a system where read-access is enabled during a RAID-5 expansion. During the expansion, data blocks are received by the fast access buffer. If the RAID controller receives a request from a file system for data blocks that happen to be resident in the fast access buffer at the time of the receipt of that request, and if the data blocks in the fast access buffer are considered to be the authoritative copies of the data blocks, the data blocks may be provided to the file system by the fast access buffer. In some cases, this should result in very rapid data access due in part to the fast access memory module's fast access times and the relatively slower access times associated with a request for data blocks from a RAID hard disk.

In a similar example of synchronizing operations, consider an example according to the current invention wherein read-only access or read-write access are enabled during a RAID expansion operation. During a RAID expansion, if file system submits a request for data blocks to the RAID controller and the data blocks are not resident in the fast access buffer at the time of the receipt of the request, the data blocks are retrieved from the disk(s) drive(s) in a RAID configuration for the file system. However, the retrieved data blocks may be provided to and/or through the fast access buffer without requiring additional disk access; none, some or all of the retrieved data blocks may be used in support of processing required by the expansion operation. In this case, the scheduling of the tasks required by the RAID expansion operation may be rearranged to make timely use of the retrieved data blocks to take advantage of the retrieved data; in some cases, the usage may be selective. By synchronizing the data block retrieval for the file system with the use of the retrieved data blocks by the fast access buffer, the impact of enabling concurrent access to data while executing a RAID expansion may be reduced.

FIG. 6 is a block diagram illustrating the steps associated with an example of enabling read operations during RAID operations for an example of a fast access buffer according to the current invention. The process begins when a controller, such as a buffer operations manager or RAID controller, manages a RAID operation in conjunction with a fast access buffer (Step 600). During the execution of the RAID operation, the controller receives or intercepts a read request for data stored on the RAID group (Step 610). The controller identifies the location of the authoritative copy of the data (Step 620). For example, the controller may check configuration parameters to confirm that when two or more copies of data exist in the environment, the copy in the fast access buffer's memory module is the authoritative copy and then check the fast access buffer's fast access memory module to determine if the requested data is temporarily stored in the fast access memory module. If the authoritative copy of the requested data is stored in the fast access memory module, the controller may fulfill the read request by initiating a copy operation from the fast access memory module (Step 630). If the authoritative copy of the requested data is not stored in the fast access memory module, the controller determines if the data exists on the RAID group (Step 640). For example, during a disk rebuild operation, the full set of data will not exist on the RAID group until the rebuild is complete. In some cases, if the data exists on the RAID group, the controller may initiate the data retrieval from the RAID group and fulfill the request or wait until the data is on the RAID group (Step 650). In some cases, coordination, synchronization and/or optimization of the RAID group access may be done to coordinate, synchronize and/or optimize access to the RAID group and/or the efficient completion of the RAID operation. For example, retrieving the data from the RAID group may be synchronized with the RAID operation to minimize access and/or copying operations associated with the disk drives in a RAID configuration.

In some cases, the current invention may be used to support adding and/or shrinking a RAID group's capacity. For example, when adding a disk to a RAID array or a new RAID array grouping a RAID-on-RAID configuration, data may be moved from disk to disk and/or RAID array to RAID array. In addition, expanding or shrinking a RAID group's capacity may require moving and/or recalculating redundancy data For example, using the current invention to support operations such as adding and/or shrinking a RAID group's capacity may support fast access to in-buffer data, improved input/output performance based on large data transfers and reduced number of disk accesses instead of block-by-block based operations. Similarly, the current invention may be used in conjunction with RAID operations such as changing the stripe size, migrating to a different RAID level, migrating hardware and/or software.

Foregoing descriptions of specific embodiments of the invention have been presented for purposes of illustration and description. They are not intended to be exhaustive or to limit the invention to the precise forms disclosed. Modifications and variations are possible in light of the above teaching. For example, applicants contemplate that present invention may be applied for various purposes.

The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

We claim:
1. A method comprising:
    storing data blocks in a fast access buffer during Redundant Array of Inexpensive Disks (RAID) reconfiguration operations according to an ordering of the data blocks in one or more source RAID devices;

moving the data blocks in the fast access buffer to correspond to an ordering for the data blocks to be stored in one or more target RAID devices, wherein the moving is performed according to a number of the target RAID devices to receive the data blocks responsive to a RAID device controller, and wherein the number of target RAID devices is different than a number of the source RAID devices;

enabling an external device to access at least one of the data blocks stored in the fast access buffer during RAID reconfiguration operations when the external device initiates data access operations that target at least one of the source RAID devices or the target RAID devices; and transmitting data blocks from the fast access buffer to the target RAID devices responsive to the RAID device controller.

2. The method of claim 1 wherein at least one of the source RAID devices or the target RAID devices includes at least one of a disk drive, a disk array, or a RAID array.

3. The method of claim 1 wherein:
the one or more source RAID devices operates according to a RAID level selected from the group comprising RAID level 0, RAID level 1, RAID level 2, RAID level 3, RAID level 4, RAID level 5, RAID level 6, RAID level 10, RAID level 50, RAID level 53, RAID level 0+1; and
the one or more target RAID devices operates according to a RAID level selected from the group comprising RAID level 0, RAID level 1, RAID level 2, RAID level 3, RAID level 4, RAID level 5, RAID level 6, RAID level 10, RAID level 50, RAID level 53, RAID level 0+1.

4. The method of claim 1 wherein at least one of the source RAID devices and at least one of the target RAID devices are the same device.

5. The method of claim 1 wherein the fast access buffer comprises random access memory (RAM).

6. The method of claim 1 further comprising executing one or more RAID operations selected from the set of:
rebuilding a RAID array, rebuilding a RAID drive, expanding a RAID array, shrinking a RAID array, migrating RAID data to accommodate a RAID hardware migration, migrating RAID data to accommodate a RAID software migration, migrating RAID data to migrate to a different RAID level, reformatting a RAID array, restoring a RAID array, and restoring a disk drive in a RAID configuration.

7. The method of claim 1
wherein a controller is coupled to the fast access buffer; and
managing RAID operations in the fast access buffer, at least in part, by the controller including at least one of a RAID controller, a RAID controller controlling one or more of the source RAID devices, a RAID controller controlling one or more of the target RAID devices, or a buffer operations manager, or any combination thereof.

8. The method of claim 1 further comprising:
identifying at least one data block in the fast access buffer; and
calculating the target location for the identified data block on at least one of the target RAID devices.

9. The method of claim 8 further comprising:
after calculating the target location for the identified data block on the target RAID device, copying data blocks from the fast access buffer to the one or more target RAID devices including copying data blocks to the one or more target RAID devices from non-adjacent positions within the fast access buffer.

10. The method of claim 9 wherein executing RAID operations includes:

calculating new data redundancy information and creating one or more new data redundancy blocks reflecting the new data redundancy information; and
identifying the target locations on the target RAID device for the new data redundancy blocks; and
wherein copying data blocks from the fast access buffer to the one or more target RAID devices includes writing the new data redundancy blocks to the target locations on the one or more target RAID device.

11. The method of claim 1 further comprising:
executing the method in an on-line mode, wherein one or more data access operations are successfully completed during the execution of the method; and
wherein the data access operations comprise one or more commands initiated from the external device targeting at least one of the one or more source RAID devices or the one or more target RAID devices.

12. The method of claim 11
wherein the data access operations include at least one of reading data, writing data, or deleting data; and
wherein at least one data access operation includes one or more commands initiated from the external device.

13. The method of claim 1 further comprising:
enabling the external device concurrent access to the fast access buffer in an on-line mode; and
identifying a location of an authoritative copy of the data associated with the data access operation.

14. The method of claim 11
wherein at least one of the data access operations is writing new data to a target RAID device or deleting old data from a target RAID device; and
enabling concurrent access in the on-line mode includes:
updating the fast access buffer according to the data operation; and
ensuring that the target RAID device is updated according to the data operation.

15. The method of claim 13 wherein enabling the external device concurrent access to the fast access buffer in the on-line mode includes enabling at least one data access operation to be executed on the fast access buffer for data blocks available in the fast access buffer.

16. The method of claim 1 further comprising:
receiving a request for the external device to access at least one of the data blocks stored in one or more source RAID devices;
reordering RAID reconfiguration operations according to the access to the data blocks requested by the external device; and
storing the requested data blocks from one or more source RAID devices to the fast access buffer, wherein the external device is configured to access the requested data blocks stored in the fast access buffer, and wherein the data blocks are rearranged in the fast access buffer and transmitted to the target RAID devices.

17. The method of claim 1 further comprising synchronizing data access operations associated with the one or more source RAID devices with the rearranging of the data blocks stored in the fast access buffer.

18. The method of claim 17 wherein synchronizing includes at least one of minimizing the data access operations, minimizing a time to complete the rearranging of the data blocks stored in the fast access buffer, or minimizing a delay associated with the data access operations.

19. A system comprising:
a controller configured to control one or more source or target RAID devices; and a fast access memory module, included in the controller, configured to store data blocks according to an ordering of the data blocks in one or more source RAID devices, wherein the controller is adapted to manage RAID operations associated with the data blocks stored in the fast access memory module, the controller to rearrange, in the fast access memory module, the data blocks received by the fast access memory module from one or more source RAID devices during RAID reconfiguration operations, wherein the controller is configured move the data blocks in the fast access buffer to correspond to an ordering for the data blocks to be stored in one or more target RAID devices, wherein the controller is configure to rearrange the data blocks according to a number of target RAID devices to receive the data blocks, wherein the number of target RAID devices is different than a number of the source RAID devices, and wherein the controller is adapted to enable an external device to access data stored in the fast access memory module during RAID reconfiguration operations when the external device initiates data access operations that target the at least one of the source RAID devices.

20. The system of claim 19 wherein the controller is at least one of a RAID controller, a RAID controller to control a source RAID device, a RAID controller to control a target RAID device, a RAID controller to control the source RAID device and the target RAID device, or a buffer operations manager.

21. The system of claim 19 wherein the fast access memory module includes random access memory (RAM).

22. The system of claim 19 wherein the controller is configured to direct the fast access memory module to store the data from one or more of the source RAID devices responsive to a request by the external device to access the data stored in one or more of the source RAID devices.

23. A server comprising:
a controller to control operations of at least one source Redundant Array of Inexpensive Disks (RAID) array;
a fast access memory module to store data from the at least one source RAID array according to an ordering that the data is stored in the at least one source RAID array; and
a buffer operations manager to direct the fast access memory module to store the data from the at least one source RAID array, wherein the controller is configured to enable an external device to access data stored in the fast access memory module when the external device initiates data access operations that target the at least one source RAID array, wherein the buffer operations manager is configured to rearrange the data stored in the fast access memory module by moving the data into a target order according to a number of target RAID devices in a target RAID array to receive the data, wherein the controller is configured to copy the data to the target RAID array based, at least in part, on the target order of the rearranged data.

24. The server of claim 23 wherein the buffer operations manager is adapted to be distributed across multiple locations internal or external to the controller, the server, and the fast access memory module.

25. The server of claim 23 wherein the buffer operations manager is adapted to be distributed across at least one of multiple software applications, hardware components, firmware components, or hardware platforms.

26. The server of claim 23 wherein the buffer operations manager is adapted to use resources local to or distributed from the server to execute some processes.

27. The server of claim 23
wherein the source RAID array operates according to a RAID level selected from the list comprising: RAID level 0, RAID level 1, RAID level 2, RAID level 3, RAID level 4, RAID level 5, RAID level 6, RAID level 10, RAID level 50, RAID level 53, and RAID level 0+1; and
wherein the target RAID array operates according to a RAID level selected from the list comprising: RAID level 0, RAID level 1, RAID level 2, RAID level 3, RAID level 4, RAID level 5, RAID level 6, RAID level 10, RAID level 50, RAID level 53, and RAID level 0+1.

28. The server of claim 23 wherein the fast access memory module includes random access memory (RAM).

29. The server of claim 23 wherein the buffer operations manager is configured to direct the fast access memory module to store the data from the at least one source RAID array responsive to a request by the external device to access the data stored in the at least one source RAID array.

* * * * *

UNITED STATES PATENT AND TRADEMARK OFFICE
CERTIFICATE OF CORRECTION

PATENT NO. : 7,774,542 B2
APPLICATION NO. : 11/175876
DATED : August 10, 2010
INVENTOR(S) : Zhang et al.

Page 1 of 1

It is certified that error appears in the above-identified patent and that said Letters Patent is hereby corrected as shown below:

Title page, item (76), under "Inventors", in Column 1, Line 4, delete "Jian Gang Ding,"
and insert -- JianGang Ding, --.

Column 13, lines 10-11, in Claim 19, delete "wherein the controller is configured move the data"
and insert -- wherein the controller is configured to move the data --.

Column 13, line 14, in Claim 19, delete "is configure" and insert -- is configured --.

Signed and Sealed this
Third Day of July, 2012

David J. Kappos
*Director of the United States Patent and Trademark Office*